Patented Apr. 8, 1941

2,237,593

UNITED STATES PATENT OFFICE 2,237,593

FOUNDRY COMPOSITION AND METHOD

Norman J. Dunbeck, Eifort, Ohio, assignor to Peerpatco, Incorporated, a corporation of Delaware No Drawing. Original application November 27, 1939, Serial No. 306,392. Divided and this application December 16, 1940, Serial No. 370,421

7 Claims. (Cl. 22—188)

My application for patent is a division of my copending application Serial No. 306,392, filed November 27, 1939, and entitled Foundry composition and method, and the invention relates to compositions of matter, and especially to compositions for foundry use.

Among the objects of my invention are the provision of a foundry composition which is strong yet permeable to the fumes and gases encountered in actual use; which may be readily and accurately prepared, so as to have any desired dry strength according to the needs of the particular type of casting being made; which, at the same time, has a satisfactorily high green strength and a high sintering point; and which does not cake or harden in use so that it may be easily recovered for repeated use.

Another object of my invention is to provide a foundry composition as described above, which can be prepared from readily available and inexpensive materials.

Other objects will be in part obvious and in part pointed out hereinafter.

The invention accordingly consists in the combination of elements, mixture of materials and composition of ingredients, and in the several steps and the relation of each of the same to one or more of the others as described herein, the scope of the application of which is indicated in the following claims.

In present foundry practices, a small amount of bonding clay is added to clean silica sand which is tempered with water to form a moist workable mass. The clay may be blended either with clean sand or with a mixture of clean and burnt sand. In forming a mold, this composition is rammed about a pattern placed within a molding flask. The clay present in the blend gives strength to the mold so that it retains its shape when the flask is separated to remove the pattern. The clay also enables the mold to resist erosive action of the molten metal poured into it and to support the weight of that metal. Both fire clays and non-refractory clays have been used for this purpose, but these clays are not satisfactory. In order to make a mold of satisfactory strength, between 10% and 30% of this type of clay must be used, depending upon the quality of the sand, the quality of the clay and the weight of the casting being made. Such a large quantity of clay tends to severely curtail the permeance of the mold. This porosity or permeance is essential to a proper elimination of fumes evolved from the contact of hot metal with the mold walls. Hence the presence of a large amount of clay is not desirable.

A non-swelling montmorillonite clay, such as the non-colloidal Porter's Creek clay described in my Patent Number 2,128,404, or the colloidal clay set forth in my Patent Number 2,180,897, is a satisfactory bonding material. The proportion of such a clay required to produce a mold having satisfactory green strength is only about 5% of the weight of the sand. Thus a mold using a non-swelling montmorillonite clay as a binder has satisfactory permeability to gases. A disadvantage of such a mold for some purposes is its low dry strength. Another disadvantage to consumers is that non-swelling montmorillonite is found only in certain sections of the country, principally the central and south-central parts, and due to shipping charges, use of it in other sections is expensive.

Another clay, which is a satisfactory bonding material, is a swelling colloidal montmorillonite, containing approximately 20% of alumina ($Al_2O_3$) and 63% of silica ($SiO_2$), known as bentonite. This clay is found in Wyoming and in other western states. Only a small percentage of this bonding agent need be used to produce a mold of requisite green strength. A disadvantage of bentonite as a mold bonding material is, for many purposes, the objectionably high dry strength given the mold.

I find that there are many casting operations which require molds of intermediate dry strengths for best results. In my Patent 2,230,939 I have disclosed a bonding material satisfactory for such use, which consists of a blend of bentonite and non-swelling montmorillonite in proportions which will give any desired dry strength of mold.

As mentioned above, however, non-swelling montmorillonite is expensive in many sections of the country. In the western states, for example, its cost exceeds that of the locally produced bentonite. In such localities, the use of the blended binder of my Patent 2,230,939 is prohibitively expensive.

Accordingly, an object of my invention is to provide a binder for foundry compositions which is available in the western states and which gives a desired dry strength in combination with high green strength, good permeance and other features enjoyed by molds using binders of the bentonitic clays.

In accordance with my present invention, I find that desired results are had by treating Wyoming bentonite with an acid or acid salt in desired amount. For this purpose, I use either an acid, such as hydrochloric acid, or an acid salt, for example potassium nitrate, sodium alum or ammonium carbonate. One or more of these materials are readily available in most localities. Since only a relatively small amount of one of these materials is required to achieve the desired result by my invention, their use is not expensive. This is particularly true because the materials themselves are inexpensive.

I have found that when bentonite is chemically treated with an acid or an acid salt and is then used as a bonding material, it imparts to the mold a dry strength materially less than that resulting from the use of untreated bentonite alone. The dry strength of the mold varies inversely as the amount of acid or acid salt blended with the bentonite. Thus the result of using a certain amount of treating material is definitely predictable.

I have found that the same result will not follow where the salt used is basic in nature. A basic salt mixed with bentonite will cause the mold dry strength to increase, rather than decrease, until an excess of such salt has been added, when the dry strength decreases.

The patent to Hanley No. 1,657,573 discloses that when bentonite is mixed with sand and water each minute particle of the bentonite which is attached to any sand grain will swell up an appreciable extent and spread over the grain in the form of a sticky gelatinous film. This will cause each grain to effectively adhere to the adjacent grains without filling up the spaces between them. A possible explanation for the action of acid and acid salts on bentonite is that they increase its viscosity and thus reduce its spreading ability so that it does not bind as many grains of the sand as it does in its untreated condition. I do not desire, however, to be bound by this explanation.

In practicing my invention, an acid salt, such as potassium nitrate, sodium alum or ammonium carbonate, may be mixed with bentonite when both are in a dry condition before adding the bentonite to the sand. Equally good results are achieved when the dry salts are added to the sand at the same time the bentonite is mixed therewith. Another satisfactory manner of introducing the salts is by dissolving them in the water used to temper the sand. Still another method of treating the bentonite lies in using a dilute solution of inorganic acid, such as, hydrochloric acid, in place of the tempering water.

When acid salts are added in a dry condition, the bentonite and salt are mixed in a muller mixer, then are added to the sand in the proportions of 95% sand and 5% binder and are mixed with it for one minute. As an alternative method, the sand and bentonite in the proportions of 95% sand and 5% bentonite may be placed in a muller mixer together with the salts and may be mixed dry for one minute. In either method, tempering water is then added in sufficient amount to give a moist workable mass, about 3% water generally being sufficient, and the mixing is continued for four more minutes. The composition is then ready for use in a mold.

When the bentonite is treated by a dilute acid or by an aqueous solution of an acid salt, the same method of preparing the composition is employed except, of course, that no salt need then be mixed dry with the bentonite and sand. In this method, the acid or acid salt solution is used as a substitute for the 3% of tempering water used in the other method.

To compare the strengths of molds using treated and untreated bentonite respectively as a binder, I prepared several dry mixing 95% sand and 5% bentonite for one minute, then adding 3% tempering water and mixing for four more minutes. I then conducted strength tests in accordance with recommendations of the American Foundrymen's Association in its book "Testing and Grading Foundry Sands and Clays," published in 1938. The resultant green and dry strengths of the molds containing treated and untreated bentonite are given in the following table. The percentages of salt listed represent the proportion of the salt to the bentonite by weight. The percentages of acid given represent the proportion of the volume of concentrated acid to the volume of the tempering water employed.

*Sand mold compositions*

| Bonding material | Green compression strength | Dry compression strength |
|---|---|---|
| | Lbs. per sq. in. | Lbs. per sq. in. |
| 5% untreated bentonite | 7.64 | 76.1 |
| 5% bentonite plus— | | |
| 1% potassium nitrate | 7.28 | 57.4 |
| 2% potassium nitrate | 7.32 | 50.8 |
| 4% potassium nitrate | 6.69 | 41.9 |
| 5% bentonite plus— | | |
| 1% sodium alum | 8.16 | 67.2 |
| 2% sodium alum | 8.52 | 64.0 |
| 4% sodium alum | 8.70 | 57.8 |
| 5% bentonite plus— | | |
| 1% ammonium carbonate | 7.77 | 62.3 |
| 2% ammonium carbonate | 8.15 | 53.3 |
| 4% ammonium carbonate | 7.15 | 40.5 |
| 5% bentonite plus— | | |
| 3.33% hydrochloric acid in water | 7.96 | 73.1 |
| 8.33% hydrochloric acid in water | 7.43 | 40.0 |
| 16.66% hydrochloric acid in water | 7.29 | 32.5 |

From an inspection of the above table, it will be seen that not only can the dry strength be modified by adding certain amounts of acids or acid salts but also that the green strength can be changed to some extent. Thus, a binder containing 4% potassium nitrate will produce a mold having a green compression strength of 6.69 pounds per square inch, whereas one containing 4% sodium alum will give a green strength of 8.70 pounds per square inch.

Unlike untreated bentonite, my mold composition is easily handled. It is not so gummy or sticky as ordinary bentonite. It flows freely. It is readily rammed about a pattern using a conventional jolt machine. The sand packs tightly about the pattern. A smooth surface results accurately following the details of the pattern. The mold is strong and durable. It is well retained in the cope as it is lifted from the drag to remove the pattern. The mold from which the pattern is withdrawn is clean-cut and free of edge breaks and cracks. A minimum of repair to the mold before use, therefore, is required. At the same time, however, the mold is porous and readily permeable to the fumes and gases encountered in actual practical use.

Moreover, by using the method of my invention, it is easy to prepare a mold having any desired strength. The amount of acid or salt which must be used for a certain mold strength is definitely predictable as the strength varies inversely as to the amount of treating material used.

Furthermore, where a certain small percentage of treating material is used as herein outlined, the mold in a dry condition is not caked or hardened. Hence it is possible to recover the molding material by a screening operation for reuse in combination with clean sand.

By virtue of my invention, in any locality where bentonite clay is readily available, that is in the western part of the country, an inexpensive molding material can be prepared which is suitable for the particular casting being made. For a heavy casting, such as a machine base, bentonite alone or in combination with a very small amount of acid or salt is used as a binder, so that the mold dry strength is high. Where an intermediate dry strength is desired, for a medium weight casting a larger percentage of acid or salt is used. Where the casting is to be a light, thin-walled article, a mold of low dry strength is desired and for this purpose still more of the acid or salt is introduced into the binder. When the mold strength is low, a thin casting can contract upon cooling without danger of being cracked by an unyielding mold part. The interior part of a low strength mold collapses upon cooling and thus allows unimpeded contraction of the casting.

Thus, it will be seen that there has been provided in my invention a composition and art of employing the same in which the various objects hereinbefore noted together with many thoroughly practical advantages are successfully achieved. It will be seen that my bonding composition is well adapted to withstand the many varying conditions of actual operational use in many applications, particularly as a binder in sand.

Although my invention has been described in connection with a mold, it will be understood that it is also applicable to other foundry uses. It is suitable for application to the construction of cores and facing materials.

Furthermore, my bonding material may be used in combination with new silica sand, burnt silica sand, new molding sand, burnt molding sand, lake sand or bank sand. Also, small quantities of neutral auxiliary binders, such as cereal binders, cement, goulac, pitch or rosin and casting cleaning elements, such as sea coal, wood, flour or oils may be added.

While the amount of bonding material is illustratively given as about 5% of the weight of the sand with which it is mixed, it will be understood that good results are obtained when the amount of bonding material varies from about 2% to 8% of the sand weight. In fact, these proportions can be extended to ½% to 8% where a part of the sand is burnt sand, since the bonding material is reversible in character and that present in the burnt sand is called into play, thus decreasing the amount which need be added.

Similarly, while the acid salt added to the bentonite as given in the table, amounts to some 1% to 4% of the bentonite used, I find that it frequently is advantageous to extend this range from, say ½% to 10% by weight of bentonite. So, also, where an inorganic acid is employed, this may range from some 1% to 25% by volume of tempering water.

As many possible embodiments may be made of my invention and as many changes may be made in the embodiments hereinbefore set forth, it is to be understood that all matter described herein is to be interpreted illustratively and not in a limiting sense.

What I claim is:

1. In a composition of matter of the class described, a foundry composition comprising in combination, sand, bentonite, and an aqueous solution of hydrochloric acid.

2. In a composition of matter of the class described, a foundry composition comprising in combination sand, and one-half percent to eight percent of a bonding material, said bonding material consisting of bentonite treated with a 1% to 25% aqueous solution of hydrochloric acid.

3. In preparing a composition for foundry purposes, the art which consists of dry mixing sand with ½% to 8% bentonite by weight, tempering the mixture with an aqueous solution of hydrochloric acid, and mixing materials in a wet condition.

4. In preparing a composition for foundry purposes, the art which consists of mixing with sand a binder amounting to ½% to 6% by weight of the sand, the said binder comprising bentonite and a dilute aqueous solution of hydrochloric acid.

5. In a composition of the matter of the class described, a foundry binder comprising in combination, bentonite and an aqueous solution of hydrochloric acid.

6. In a composition of the matter of the class described a foundry binder comprising in combination bentonite and a 1% to 25% aqueous solution of hydrochloric acid.

7. In preparing a binder for foundry compositions, the art which comprises mixing bentonite with an aqueous solution of hydrochloric acid.

NORMAN J. DUNBECK.